United States Patent
Adolf et al.

(10) Patent No.: US 9,541,458 B2
(45) Date of Patent: Jan. 10, 2017

(54) METHOD FOR DETERMINING A TEMPERATURE IN A WINDING OF SUBCONDUCTORS OF AN ELECTRIC MACHINE

(75) Inventors: Haiko Adolf, Erfurt (DE); Marcus Banda, Erfurt (DE); Norbert Keyssner, Erfurt (DE); Roland Röding, Ellrich (DE); Lothar Trefflich, Eckstedt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 426 days.

(21) Appl. No.: 14/122,808

(22) PCT Filed: May 24, 2012

(86) PCT No.: PCT/EP2012/059662
§ 371 (c)(1),
(2), (4) Date: Dec. 20, 2013

(87) PCT Pub. No.: WO2012/171768
PCT Pub. Date: Dec. 20, 2012

(65) Prior Publication Data
US 2014/0092938 A1     Apr. 3, 2014

(30) Foreign Application Priority Data
Jun. 14, 2011  (EP) .................... 11169801

(51) Int. Cl.
*G01K 11/00* (2006.01)
*G01K 11/12* (2006.01)
(Continued)

(52) U.S. Cl.
CPC ............ *G01K 11/12* (2013.01); *G01K 1/14* (2013.01); *G01K 11/3213* (2013.01)

(58) Field of Classification Search
None
See application file for complete search history.

(56) References Cited

U.S. PATENT DOCUMENTS

| 4,278,349 A | 7/1981 | Sander |
| 6,215,927 B1 | 4/2001 | Singh |

(Continued)

FOREIGN PATENT DOCUMENTS

| CN | 1294674 A | 5/2001 |
| DE | 19507941 A1 | 9/1995 |

(Continued)

*Primary Examiner* — Erica Lin
(74) *Attorney, Agent, or Firm* — Beusse Wolter Sanks & Maire

(57) ABSTRACT

A method for determining a temperature at a predetermined location in a winding of subconductors of an electric machine is provided where each subconductor is encased in electric subconductor insulation. The method includes pre-determining the location between one of the subconductors and the associated subconductor insulation; arranging, in said winding, an optical fiber with a sensor material piece that is fixed to the predetermined location, the optical properties of said sensor material piece being temperature-dependent and uninfluenced by stretching; exposing the sensor material piece to light via the optical fiber such that, following an interaction with the sensor material piece, light is emitted from said sensor material piece; measuring the spectrum of the light; and using this spectrum to determine the temperature at the predetermined location.

12 Claims, 1 Drawing Sheet

(51) Int. Cl.
  *G01K 1/14* (2006.01)
  *G01K 11/32* (2006.01)

(56) References Cited

U.S. PATENT DOCUMENTS

| | | | |
|---|---|---|---|
| 2002/0196994 A1 | 12/2002 | Bosselmann | |
| 2006/0250683 A1 | 11/2006 | Balan | |
| 2006/0251147 A1* | 11/2006 | Balan | G01K 11/3213 374/152 |

FOREIGN PATENT DOCUMENTS

| | | |
|---|---|---|
| DE | 19962668 C1 | 12/2000 |
| JP | 8080011 A | 3/1996 |

\* cited by examiner

METHOD FOR DETERMINING A TEMPERATURE IN A WINDING OF SUBCONDUCTORS OF AN ELECTRIC MACHINE

CROSS REFERENCE TO RELATED APPLICATIONS

This application is the U.S. National Stage of International Application No. PCT/EP2012/059662 filed May 24, 2012, and claims the benefit thereof. The International Application claims the benefit of European Application No. EP 11169801 filed Jun. 14, 2011. All of the applications are incorporated by reference herein in their entirety.

FIELD OF INVENTION

The invention relates to a method for determining a temperature in a winding of subconductors of an electric machine.

BACKGROUND OF INVENTION

In an electric machine having a high terminal power, such as e.g. a power plant generator, electrical conductors having a high electrical conductivity are conventionally installed. If the cross section of an electrical conductor is increased, the conductivity does not increase to the same extent, however, on account of eddy currents occurring in the conductor. Therefore, a so-called Roebel bar is used in the electric machine, said Roebel bar having a transposition of electrical subconductors, each of the subconductors being sheathed by electrical subconductor insulation. In this case, the winding can additionally be sheathed by main insulation.

During the operation of the machine, the Roebel bar heats up, in particular owing to the current flowing through it. In order to prolong the service life of the Roebel bar, the Roebel bar is designed such that high temperatures are avoided. For this purpose, knowledge of the temperature of the Roebel bar during the operation of the machine is required; in particular, knowledge of the temperature of the hottest location, the so-called hot spot is required. The hot spot is situated between the hottest subconductor and its subconductor insulation.

Various methods are available for measuring the temperature of the Roebel bar. Conventionally, an electrical resistance thermometer or a thermoelement is introduced into the separator of the winding. However, the resistance thermometer or the thermoelement is not suitable for measuring the temperature directly at the subconductor, rather they are only used to measure temperatures within the slot but outside the main insulation.

As an alternative, an optical fiber is used, which is not electrically conductive. In this case an optical fiber is used with a so-called Bragg sensor arranged at its end. In the Bragg sensor, a periodic modulation of the refractive index is written into the optical fiber by means of a laser. This periodic modulation acts like an interference filter in which, after the interference filter has been exposed to light, light having a predetermined spectrum is reflected back. The central wavelength of the spectrum depends on the distance between two adjacent refractive index maxima in the periodic modulation. In the event of an increase in temperature, the Bragg sensor expands, as a result of which the distance between the refractive index maxima increases and the central wavelength of the spectrum changes.

A light source is arranged at that end of the optical fiber which is remote from the Bragg sensor, said light source being used to expose the Bragg sensor to light. The spectrum of the light reflected back from the Bragg sensor is measured and the temperature of the Bragg sensor is determined from the spectrum. If the Bragg sensor is fitted to a subconductor composed of copper, then a differential expansion arises between the sensor and the subconductor on account of the increase in temperature, since glass and copper have different coefficients of thermal expansion. The differential stress disturbs the measurement, with the result that the accuracy of the measurement decreases greatly. A remedy is provided by the Bragg sensor being sheathed by a glass capillary in which the Bragg sensor can expand without experiencing external stresses.

The Bragg sensor together with the glass capillary has such a large extent that it cannot be introduced between the subconductor and the subconductor insulation, but rather is introduced the winding between the subconductor insulations. As a result, the distance between the Bragg sensor and the hot spot is approximately 2 mm to 3 mm. The accuracy of the measurement of the temperature of the hot spot decreases greatly as consequence.

SUMMARY OF INVENTION

It is an object of the invention to provide a method for determining a temperature at a predetermined location in a winding of subconductors of an electric machine wherein the method has a high accuracy.

In an embodiment, a method for determining a temperature at a predetermined location in a winding of subconductors of an electric machine, each of said subconductors being sheathed with electrical subconductor insulation, includes: predetermining the location between one of the subconductors and the associated subconductor insulation; arranging an optical fiber with a sensor material piece in the winding, wherein the sensor material piece is fitted to the predetermined location and the optical properties of the sensor material piece are temperature-dependent and not influenced by expansion; exposing the sensor material piece to light via the optical fiber, such that, after an interaction with the sensor material piece light is emitted by the sensor material piece; detecting the spectrum of the light; determining the temperature at the predetermined location with the spectrum. The method makes it possible advantageously to measure the temperature at a hot spot of the winding and during the operation of the electric machine.

Preferably, the subconductor makes contact with the sensor material piece. Furthermore, the sensor material piece is preferably fixed to that end of the optical fiber which is arranged at the predetermined location. The sensor material piece preferably comprises a semiconductor, in particular a gallium arsenide crystal. Gallium arsenide is a semiconductor which is distinguished by a small energy difference between the valence band and the conduction band, the so-called band gap. Light having an energy higher than the energy difference of the band gap is absorbed with an electron being raised from the valence band into the conduction band. A light source is arranged at that end of the optical fiber which is remote from the sensor, said light source being used to expose the gallium arsenide crystal to light. The spectrum of light reflected back from the gallium arsenide crystal is measured. In this case, it is found that light having shorter wavelengths than a so-called band edge is absorbed. The spectral position of the band edge depends on the temperature and shifts at approximately 0.4 nm/K.

From the spectrum the band edge is determined and the temperature of the gallium arsenide crystal is determined therefrom.

The predetermined location is preferably a precalculated hot spot of the winding. Preferably the sensor material piece is fitted in a cutout provided in one of the subconductors. Furthermore, the optical fiber is preferably mounted in a sheathing. Moreover, preferably a plurality of locations distributed over the length of the winding are predetermined.

BRIEF DESCRIPTION OF THE DRAWINGS

The invention is explained in greater detail below with reference to the accompanying schematic drawings.

DETAILED DESCRIPTION OF INVENTION

Figure 1:
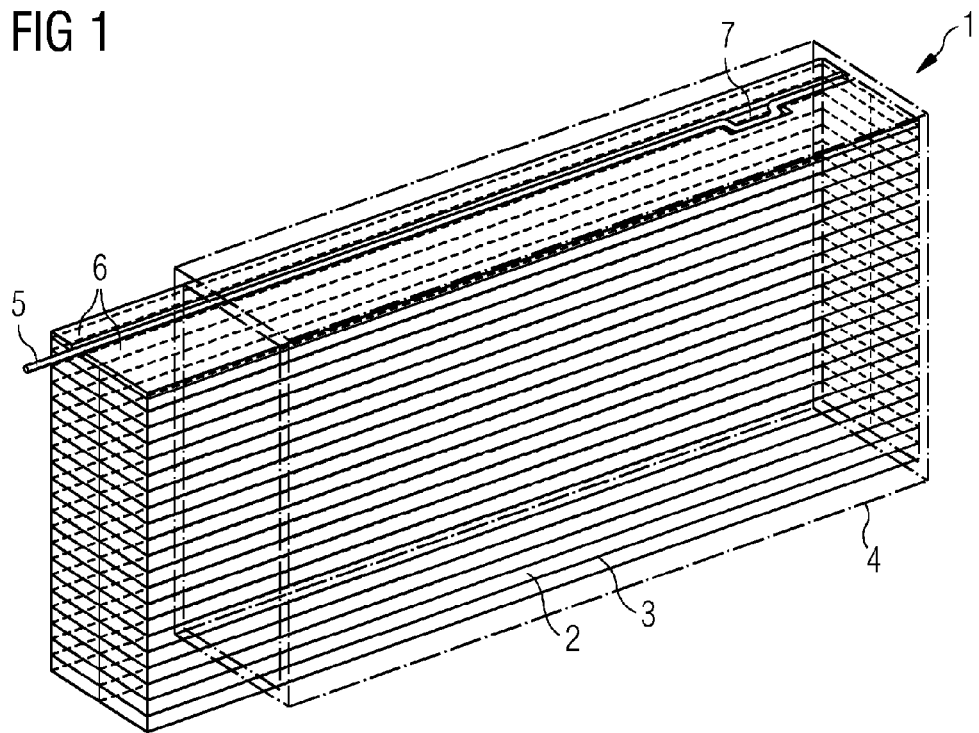
FIG. 1 and FIG. 2 show different views of perspective illustrations of a section through a Roebel bar with an optical fiber provided according to the method described herein.
Figure 2:
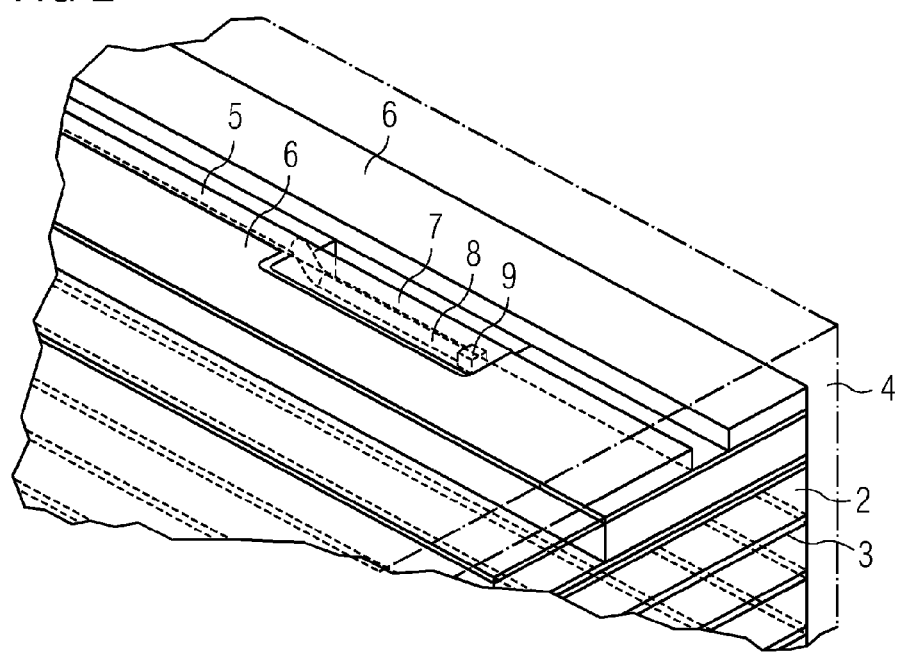

As can be seen from FIG. 1, the Roebel bar 1 has electrical subconductors 2 having a rectangular cross section, each of said subconductors being sheathed by subconductor insulation 3. The subconductors 2 are stacked one above another and alongside one another, the totality of the subconductors being sheathed by main insulation 4. Between the main insulation 4 and the topmost subconductor 2, an optical fiber 5 is arranged between two spacers 6. In this case, the optical fiber is guided in the longitudinal direction of the Roebel bar 1. A cutout 7 is provided in the topmost subconductor 2. As can be seen from FIG. 2, the end of the optical fiber 8 is fitted in the cutout 7. A sensor material piece 9 is arranged at the end of the optical fiber 8.

An embodiment of the method is explained in greater detail below on the basis of an example.

A plurality of hot spots of the Roebel bar 1 are precalculated. At each of the precalculated hot spots, a cutout 7 is provided in the subconductors 2. For each of the hot spots, a respective optical fiber 5 is provided, at the end 8 of which a gallium arsenide crystal is arranged. By means of spacers 6, the optical fibers 5 are guided in the Roebel bar, the gallium arsenide crystals being arranged in the cutouts 7. The main insulation 4 is subsequently applied to the Roebel bar 1. During the operation of the electric machine into which the Roebel bar 1 is installed, the gallium arsenide crystals are exposed to light from the opposite ends of the optical fibers 5. The spectra of the light reflected back from the gallium arsenide crystals are measured. The temperatures of the gallium arsenide crystals are determined from the measured spectra.

The invention claimed is:

1. A method for determining a temperature at a predetermined location in a winding of subconductors of an electric machine, each of said subconductors being sheathed with electrical subconductor insulation, said method comprising:

predetermining the location between one of the subconductors and the associated subconductor insulation, wherein the location is a precalculated hot spot of the winding;

arranging an optical fiber with a sensor material piece in the winding, wherein the sensor material piece is fitted to the predetermined location and the optical properties of the sensor material piece are temperature-dependent and not influenced by expansion;

exposing the sensor material piece to light via the optical fiber, such that, after an interaction with the sensor material piece light is emitted by the sensor material piece;

detecting the spectrum of the light; and determining the temperature at the predetermined location with the spectrum.

2. The method as claimed in claim 1, wherein the subconductor makes contact directly with the sensor material piece.

3. The method as claimed in claim 1, wherein the sensor material piece is fixed to that end of the optical fiber which is arranged at the predetermined location.

4. The method as claimed in claim 1, wherein the sensor material piece comprises a gallium arsenide crystal.

5. The method as claimed in claim 1, wherein the sensor material piece is fitted in a cutout provided in one of the subconductors.

6. The method as claimed in claim 1, wherein the optical fiber is mounted in a sheathing.

7. The method as claimed in claim 1, wherein a plurality of locations distributed over the length of the winding are predetermined.

8. A method, comprising:

arranging an optical fiber with a sensor material piece in a winding of an electric machine, wherein optical properties of the sensor material piece are temperature-dependent and not influenced by expansion;

locating the sensor material piece directly on a surface of a subconductor in the winding;

exposing the sensor material piece to light via the optical fiber, such that, after an interaction with the sensor material piece light is emitted by the sensor material piece;

detecting the spectrum of the light; and determining the temperature at a location of the sensor material piece with the spectrum.

9. The method as claimed in claim 8, wherein the sensor material piece comprises a semiconductor.

10. The method as claimed in claim 9, wherein the sensor material piece comprises a gallium arsenide crystal.

11. The method as claimed in claim 8, further comprising precalculating a hot spot of the winding and locating the sensor material piece at the hot spot.

12. The method as claimed in claim 8, wherein the sensor material piece is fitted in a cutout the subconductor.

* * * * *